US011536956B2

(12) United States Patent
Miller et al.

(10) Patent No.: US 11,536,956 B2
(45) Date of Patent: Dec. 27, 2022

(54) HIGH DENSITY GALVO HOUSING FOR USE WITH MULTIPLE LASER BEAMS

(71) Applicant: PRECO, LLC, Somerset, WI (US)

(72) Inventors: Daniel B. Miller, New Richmond, WI (US); James J. Bucklew, Somerset, WI (US); Kyle Enloe, Hudson, WI (US); David Plourde, New Richmond, WI (US); Brian Lindahl, Somerset, WI (US)

(73) Assignee: PRECO, LLC, Somerset, WI (US)

( * ) Notice: Subject to any disclaimer, the term of this patent is extended or adjusted under 35 U.S.C. 154(b) by 1522 days.

(21) Appl. No.: 14/543,229

(22) Filed: Nov. 17, 2014

(65) Prior Publication Data

US 2015/0144608 A1    May 28, 2015

Related U.S. Application Data

(60) Provisional application No. 61/908,533, filed on Nov. 25, 2013.

(51) Int. Cl.
*G02B 26/10* (2006.01)
*B23K 26/067* (2006.01)
*B23K 26/06* (2014.01)

(52) U.S. Cl.
CPC ........ *G02B 26/105* (2013.01); *B23K 26/0604* (2013.01); *B23K 26/067* (2013.01)

(58) Field of Classification Search
CPC ........ G02B 7/182; G02B 5/08; G02B 17/002; G02B 26/0833; G02B 26/0841; G02B 7/023; G02B 26/105; B23K 26/0604; B23K 26/067; B23K 26/0643

USPC ....... 219/121.76, 121.74; 359/850, 855, 871, 359/872, 196.1–226.3
See application file for complete search history.

(56) References Cited

U.S. PATENT DOCUMENTS

| | | | |
|---|---|---|---|
| 4,270,130 A | 5/1981 | Houle et al. |
| 5,388,318 A | 2/1995 | Petta |
| 6,615,099 B1 | 9/2003 | Muller et al. |
| 6,809,290 B2 | 10/2004 | Gross et al. |
| 6,819,038 B2 | 11/2004 | Song et al. |
| 7,065,121 B2 | 6/2006 | Filgas et al. |

(Continued)

OTHER PUBLICATIONS

European Search Report issued for EP Patent Application No. 14193417, dated Jun. 26, 2015.

*Primary Examiner* — Dana Ross
*Assistant Examiner* — Joe E Mills, Jr.
(74) *Attorney, Agent, or Firm* — Westman, Champlin & Koehler, P.A.; Z. Peter Sawicki; Amanda M. Prose

(57) ABSTRACT

A multi-beam laser processing system comprising a plurality of laser beams and a plurality of pairs of selectively rotatable mirrors for laser beam steering where each laser beam is independently steered by one pair of selectively rotatable mirrors. The plurality of pairs of mirrors are positioned adjacent to one another within a single main body. The main body is positioned directly opposing the beams, the mirrors directing each laser beam simultaneously to a selected location on a substrate. The main body comprises a plurality of vents; a plurality of passages; a plurality of openings; and a plurality of galvos nested densely within the main body. The galvos direct multiple laser beams to a substrate wherein the fields of view overlap and the laser beam focal point remains small and precise.

14 Claims, 4 Drawing Sheets

(56) References Cited

U.S. PATENT DOCUMENTS

| | | | |
|---|---|---|---|
| 7,078,650 B2 | 7/2006 | Gross et al. | |
| 7,147,889 B2 | 12/2006 | Misura et al. | |
| 7,176,409 B2 | 2/2007 | Gross et al. | |
| 7,206,120 B2 | 4/2007 | Gross et al. | |
| 7,796,314 B2 * | 9/2010 | Sutko | G02B 21/0048 359/198.1 |
| 7,956,858 B2 * | 6/2011 | Sprague | G02B 27/104 345/204 |
| 8,390,795 B2 | 3/2013 | Kotler et al. | |
| 8,498,037 B2 * | 7/2013 | Andreasch | B23K 26/0608 219/121.63 |
| 2002/0075786 A1 * | 6/2002 | Ikegame | G02B 6/3572 369/221 |
| 2003/0011782 A1 | 1/2003 | Tanno | |
| 2004/0168179 A1 | 8/2004 | Ikegame | |
| 2006/0084957 A1 | 4/2006 | Delfyett et al. | |
| 2010/0134859 A1 * | 6/2010 | Hastings | G02B 7/1821 359/200.7 |
| 2010/0165435 A1 * | 7/2010 | Grapov | B23K 26/0676 359/226.1 |
| 2014/0001162 A1 * | 1/2014 | Tanaka | B23K 26/352 219/121.6 |

* cited by examiner

HIGH DENSITY GALVO HOUSING FOR USE WITH MULTIPLE LASER BEAMS

CROSS-REFERENCE TO RELATED APPLICATIONS

The present application is based on and claims the benefit of U.S. provisional patent application Ser. No. 61/908,533, filed Nov. 25, 2013, the content of which is hereby incorporated by reference in its entirety.

FIELD OF THE INVENTION

The present disclosure relates to a high-speed multiple laser beam cutting and/or laser processing system, and more particularly to a system employing a novel configuration of a plurality of laser beams and a plurality of laser beam steering mirrors, where the steering mirrors are in a compact, nested, and high density configuration within a single housing.

BACKGROUND

Laser processing of a moving web with multiple laser beams can be done to increase speed and efficiency of a laser system. Existing laser perforation systems typically employ some sort of scanning system or galvo system, utilizing rotatable mirrors, to move a laser beam across the web in a predetermined pattern. The utilization of a second or subsequent laser beam may also necessitate the addition of a second or subsequent galvo system to direct additional laser beams in some systems.

However, the configuration and positioning of multiple galvo systems in a compact nested single laser processing unit has been limited and challenged by heat generation, space considerations, and the mechanical integrity of the processing unit. Heat is generated from at least two sources, the laser beam itself traveling through the galvo system and the galvo motor that operates the galvo system. The galvo system generally comprises a two-mirror system, each mirror moved by a motor. The motor generates heat. The two mirrors direct the laser beam and since the laser beam is intercepted and steered by the mirrors, energy is absorbed by the mirrors and results in heat being dispersed into the space occupied by the galvo system. After a sufficient amount of operation time, heat accumulates and can be detrimental to the operation of the galvo system. Further challenges are realized when processing with galvanometer systems designed to generate and operate with optimal power densities for a given power level and field of view (or processing area). For cutting applications, especially the small spot size (area of the focused beam diameter) makes the best use of a given laser power by increasing the power density of the laser beam. This is accomplished by resolving the beam into a minimal spot size. However, in order to achieve this, the size of the galvanometer mirrors need to be sufficiently large to handle a beam capable of focusing to a minimum spot size for a given field of view and or laser and focus lens configuration. The size of the mirror/s further limits how compact a nested galvanometer housing can be for a given configuration.

Galvo systems typically include a housing in which the mirrors and galvo motors are contained within for operational reasons. The galvo mirrors and motors need to be housed in a very stable housing in order to steer the laser beam in a precise manner. In addition, each of the two mirrors is controlled by its own galvo motor. The mirrors are mounted so that one mirror is positioned in the x direction while another mirror is positioned in the Y direction. Each mirror is then movable about an axis. In addition, the housings are substantial in nature in order to provide a stable platform for the motors to be mounted on and for the mirrors to operate off of. Such housings, unfortunately, take up a fair amount of space even though considerable effort has been made to make the housings as small as possible. However, the housings generally prevent multiple galvos from being placed in close proximity in laser processing systems.

SUMMARY OF THE INVENTION

The present disclosure relates to a multi-beam laser processing system for laser processing a substrate. The laser processing system comprises a plurality of pairs of selectively rotatable mirrors for laser beam steering wherein each laser beam in the plurality of laser beams is independently steered by one pair of selectively rotatable mirrors to laser process a substrate. The system further comprises a main body in which the plurality of pairs of selectively rotatable mirrors are disposed and positioned adjacent to one another. The main body is positioned to receive the plurality of laser beams such that the laser processing system directs each laser beam concurrently into the main body to a respective pair of mirrors and further directs each laser beam through the main body to a selected location on the substrate.

The present disclosure also relates to a galvo housing comprising a main body; a plurality of vents; a plurality of passages; a plurality of openings; and a plurality of galvos nested densely within the main body. The galvos comprise pairs of selectively directable mirrors arranged within the main body to selectively direct a laser beam to a selected location on a substrate within a field of view.

The present disclosure also relates to a nested galvo system comprising a block machined to house at least two or more galvo systems therewithin. Each galvo system is sufficient to steer a laser beam, each laser beam at minimal wattage or 1000 watt power or greater. The block also keeps the galvo systems aligned sufficiently to direct the laser beams onto a work piece to process the workpiece in a selected manner, wherein the block controls heat build-up sufficiently to avoid distortion of the block in order to maintain alignment of and maintenance of the galvo mirrors.

DETAILED DESCRIPTION OF THE INVENTION

Figure 1:
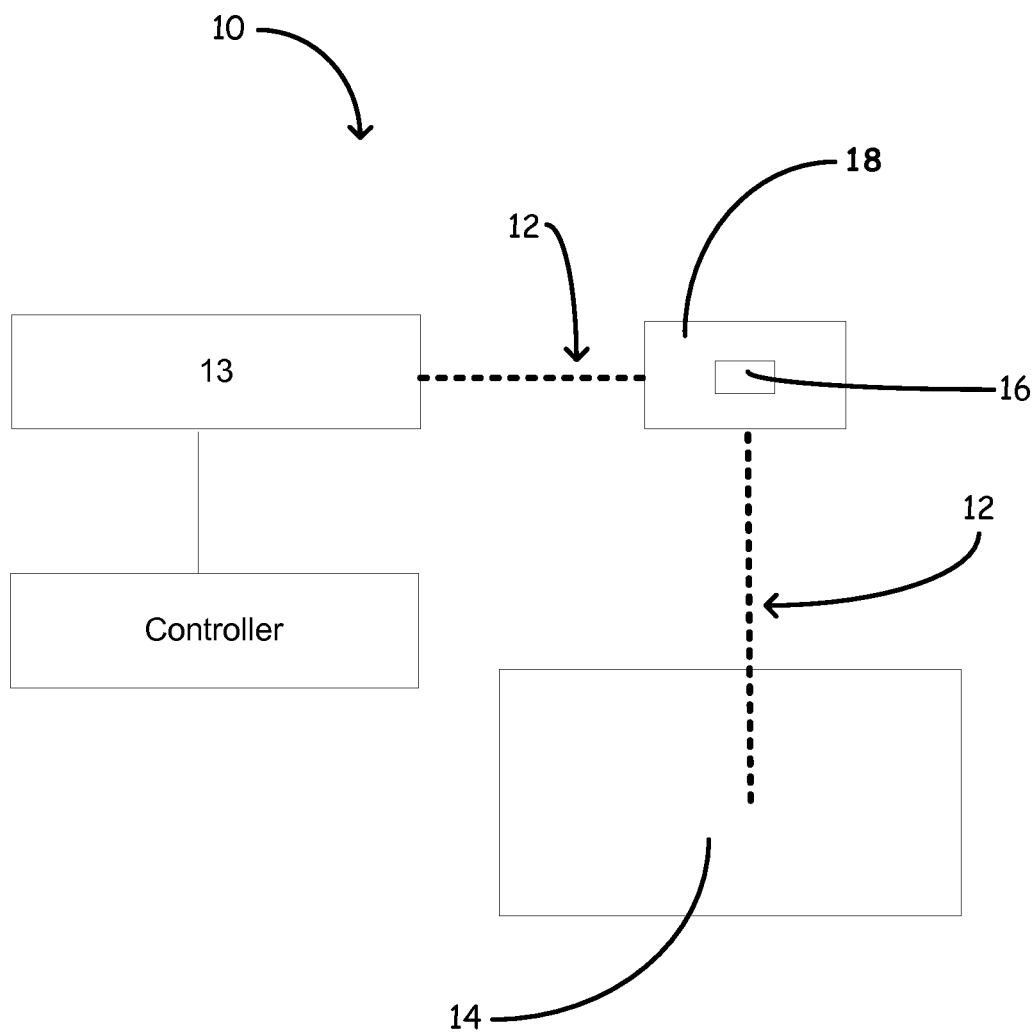
FIG. 1 illustrates a laser processing system comprising a high density galvo housing.

The present disclosure relates to a laser processing system 10 that utilizes a plurality of laser beams 12 that are capable of simultaneously processing a work piece 14. The work piece 14 includes a substrate which may be a sheet, film or other substrate suitable for laser processing and may be stationary or on a continuous moving web for processing. The terms "web" and "work piece" will be used hereinafter and should be understood to include both stationary and continuously moving substrates for laser processing.

The plurality of laser beams 12 are directed to the work piece, and are steered on and around the work piece by a plurality of galvo systems 16. The galvo systems 16 are mounted in a high density galvo block 18. The galvos 16 are nested within the block 18 to steer and otherwise direct multiple laser beams simultaneously and in a coordinated manner within a selected field of view on the web or work piece. The nested galvo block 18 is formed or machined to house the plurality of galvo systems 16. The nested galvo block 18 illustrated generally in the figures may house anywhere from two galvo systems 16 up to six or more galvo systems 16, which allows the high density galvo block 18 to steer anywhere from two to six or more individual laser beams 12. The present disclosure is not limited to a specific number of galvo systems, however six (6) galvos are illustrated for clarity in FIGS. 2 and 3. Additional or fewer galvo systems may be positioned in the block in substantially the same manner and with similar considerations as discussed herein.

As referred to throughout this description, the terms "galvo" and "galvo system" may be used interchangeably and refer to a configuration having a single galvo motor and mirror, with single axis motion (x or y) and alternatively also refers to a set, or pair, of galvo motors and mirrors, the set or pair including two axis motion (x and y). The galvos or galvo systems of the present disclosure may have a pair of mirrors, where each mirror is selectively directed in order to selectively steer a laser beam to a selected area on a substrate or work piece and/or within a field of view of the steered laser beam. Each mirror is selectively directed via a dedicated motor, referred to as a galvo motor, which drives the movement of that mirror. Of the pair of mirrors in a galvo system, a first mirror is generally an "x" mirror and a second mirror is generally a "y" mirror. The first mirror by its respective motor is generally positionable to steer the laser beam in an "x" direction with respect to the second mirror which by its respective motor is generally positionable to steer the laser beam in a "y" direction. The laser beam is thusly steered in the x and y directions with respect to the work piece. As previously noted; while this disclosure mainly describes a pair of galvo mirrors, this disclosure also recognizes and is not limited to the pair of mirrors, as a plurality of single selectively rotatable mirrors for laser beam steering in a single direction is within the scope of this disclosure. For a single axis galvo system the adjacent field of views will not necessarily overlap. A galvo system can therefore be comprised of a single axis or multiple (pair) axis galvo driven mirrors.

The purpose of this multi-laser beam system 10 is to increase the number of cutting beams operable on a given area of a work piece 14. Further, increasing the number of cutting laser beams in a given area decreases the time needed to complete a cutting operation and simultaneously improves the accuracy of the placement of the laser beams relative to each other on the work piece. Along with increasing the number of cutting beams, a high power laser beam, such as produced by an approximately 1,000 watt laser, is desirable along with keeping the field of view as small as possible in order to cut with a "spot size" (focal point) being as small as possible. Both the high power laser beam and the small spot size combine in providing a cutting beam that can be moved more rapidly along the work piece and when multiplied to a plurality of cutting beams, for example six beams, increases productivity immensely. The challenges in creating such a system have thus far limited its invention.

This disclosure describes a unique solution to provide a multiple laser beam system in a compact area that generates a small spot size.

The galvo systems 16 of the present disclosure may be built from individual components (i.e. mirror and motor). Also galvo systems in commercially available housings could be used by stripping them from their housings incorporating them into a housing as described in this disclosure.

Figure 2:
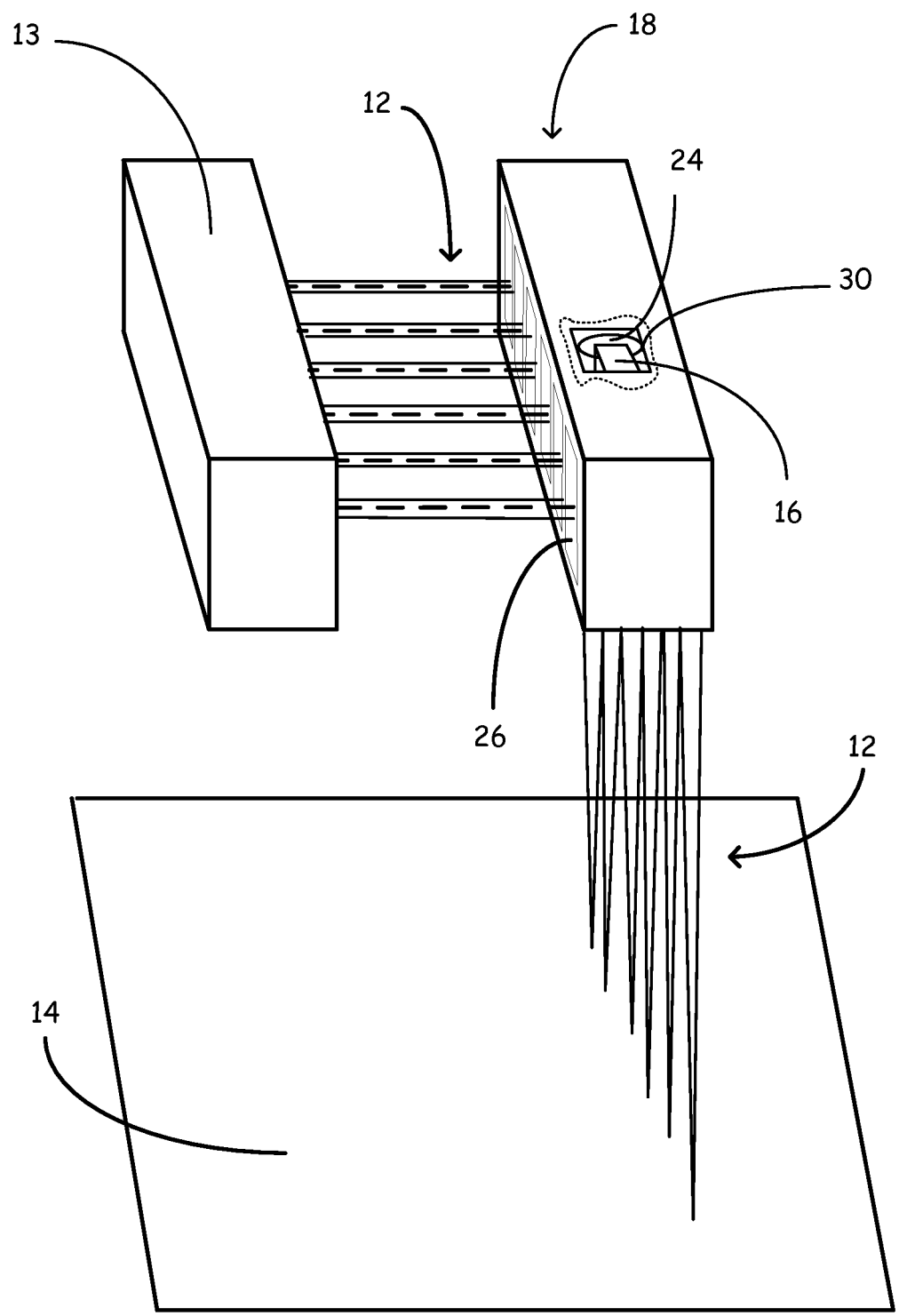
FIG. 2 illustrates the galvo housing and laser beam configuration as used within the laser processing system.
Figure 3:
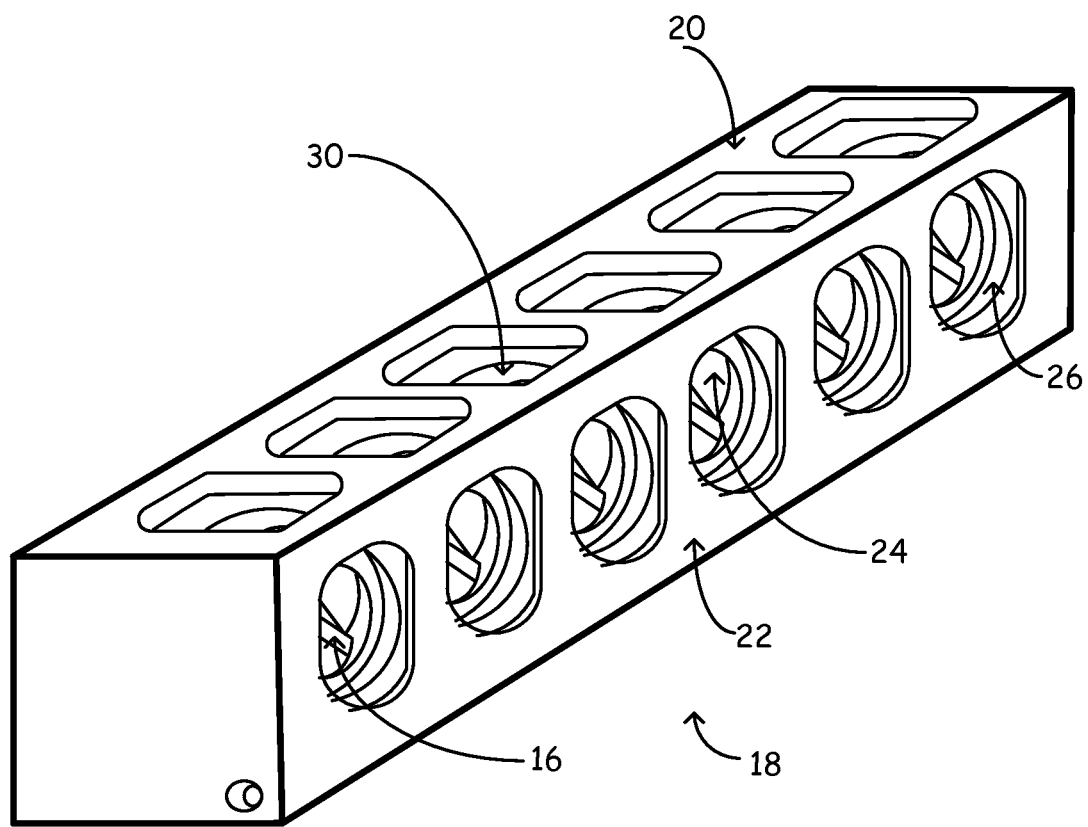
FIG. 3 is a perspective view of the high density galvo housing.
Figure 4:
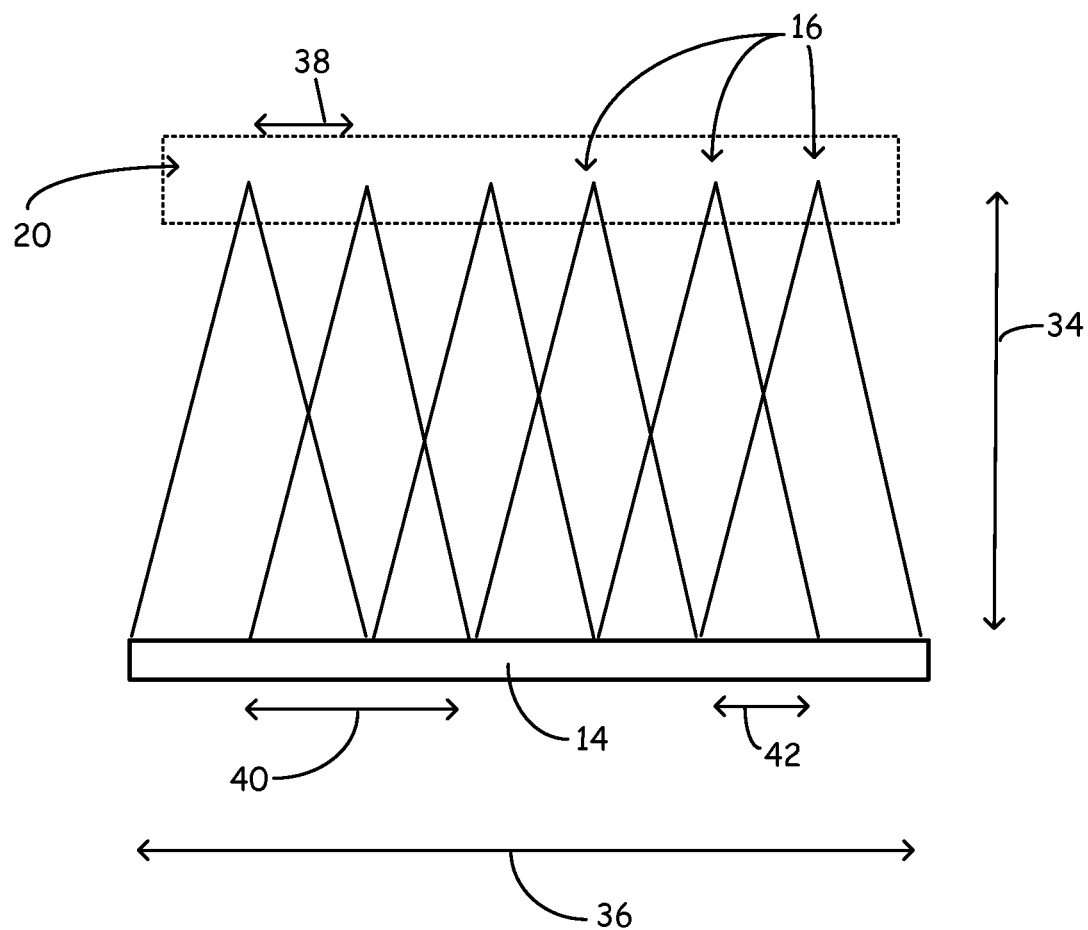
FIG. 4 is a diagram of the galvo positioning in the galvo housing with respect to a field of view and laser processing field.

The galvo block 18 of the present disclosure comprises a main body 20 formed to nest the plurality of galvo systems 16 proximate one another within the main body 20. By proximate it is meant that the galvo systems are set within the main body as closely to one another as possible, without interfering with the operation of an adjacent galvo system. The galvo block 18 in one embodiment is generally in the shape of a rectangular box such that when the plurality of galvos 16 are nested therein, the plurality of galvos are linearly aligned. The galvos are nested linearly and along the length of the block, and in as close proximity to one another as possible. It is also recognized that other embodiments maintaining the close proximity of the galvo systems with respect to each other, but not necessarily in a straight line are also within the scope of this disclosure; compactly nested with a staggered relationship from one to another. As illustrated in FIGS. 1-4, when used in a multiple laser beam laser processing system, the nested galvo block 18 is positionable such that each galvo system 16 is disposed to receive a laser beam 12 so that each galvo system 16 may independently and selectively steer its respective laser beam 12 during laser processing of the web 14. In an alternate embodiment, the plurality of laser beams may be generated from a laser source 13 wherein the laser source produces multiple beams or beams that are then split such that the laser source produces multiple beams, for example, six beams, as illustrated in FIGS. 2-4, with each beam being of approximately equal power. The laser source is then positioned opposite the galvo block in the laser processing system, such that the laser source generates the beam, the beam is split and each of the six laser beams are then directed into the galvo block, each beam directed to a galvo system. Further embodiments involve various combinations of lasers and beam splits such as three lasers, each laser split once or two lasers, each laser split three (3) times, and so on.

As illustrated generally in the figures, the present disclosure is a housing. The housing is a main body 20 which further comprises a galvo block 18, a plurality of galvo systems 16 nested therein, a liquid cooling system 22 and an air flow cooling system 24 replicated for each separate mirror of each galvo system 16 nested in the housing. A primary problem in producing a multi-galvo system that uses laser beams generated by a 1,000 watt laser or greater is heat build-up. Heat comes from two sources, the motors and the laser beams. The motors generate heat when moving the mirrors. The mirrors also absorb heat from the laser beams when steering the beams. Radiant heat also enters the block from the laser beams passing through the galvo systems.

As part of the solution for controlling heat build-up, the housing is integrally formed. By integrally formed, what is meant is that the housing was formed from a single piece of material. In the embodiment described herein, the housing may be machined from a single block of metal as further illustrated in FIG. 3. The machined block was machined such that selected areas of the block were machined away or removed to create a space 30 to accommodate each galvo system 16 as well as the liquid 22 and air cooling systems 24 for each mirror. Additionally, the block was machined to form a pair of openings wherein a laser beam may enter into the block and be directed through and out of the block to a substrate or web. The pair of openings comprises a first opening 26 in or on a first side of the block and a second opening (not shown) in or on a second side of the block. The pair of openings is replicated for each galvo system 16. The openings are machined such that the laser beam 12 is unobstructed when directed through the first opening 26 and into the block and thus to the respective galvo system 16 for steering. The second opening is also machined to allow the steered laser beam 12 to then exit the block unobstructed.

The spaces 30 formed in the block 20 for each galvo system 16, taken singularly and collectively, must provide sufficient heat transfer for each galvo system individually and the nested galvo systems collectively as a unit. It will be appreciated that the heat transfer capability of the block is greatly compounded by the addition of each galvo system 16 and thus the energy released by each laser beam 12 being steered by each galvo system 16. The dimensions of the machined galvo block 18 allow the plurality of galvo systems 16 to be positioned sufficiently adjacent to one another such that the space between each galvo system and thus each laser beam being steered is minimized. In the embodiment illustrated in FIG. 3, the block houses six 30 mm galvo systems, each system comprising an x and y mirror/galvo pair, wherein the size of the block is approximately 85.725×107.95×590.55 mm (3.375×4.25×23.25 inches). The spacing between each pair of galvo systems is approximately 92.075 mm (3.625 in).

As discussed above, the galvo block 18 of the present disclosure is machined from a single solid starting material comprising preferably aluminum or stainless steel. In the embodiment illustrated in FIG. 3, Aluminum is used due to its ability to produce and maintained design geometries and tolerances.

Beginning with a generally solid block of the starting material, approximately 75% of the block's initial mass is machined away. The block is precision machined according to a design which allows the block to maintain rigidity and stability during the machining process. Care is needed during machining to avoid producing unnecessary stresses in the metal, whether heat related or inherent in the metallurgical structure or both, to avoid "warping" of the metal which would lead to structural alignment issues. The block is machined to support each galvo mirror and its motor as individually nested therein and to maintain proper alignment of and to facilitate cooling of each galvo system during use. The integral nature of the block also aids in and minimizes problems for initial alignment of the galvo systems. Each galvo is nested within the block, one mirror and its respective motor at a time and each mirror is precisely positioned for that galvo system. The block 20 includes air vents for airflow control 24, open spaces between each galvo system and channels for liquid cooling 22. Additionally, the galvo blocked is machined such that there remain no "closed" or "full" internal walls or partitions. After the block was machined, there remained no full block walls separating any two adjacent galvo systems.

The selected areas removed or machined away from the galvo block are determined in response to factors including the position and selected number of galvos to be nested in the finished block. Further considerations include the stress inherent in the actual machining process and the stress and load bearing of each galvo nested therein. Additionally, each galvo generates heat in the block from its motors as well as by each mirror's absorption of heat from the respective laser beam. These stresses and heat build-up can cause the block to twist or distort. Such distortions or imperfections in the block will ultimately affect accurate laser processing by affecting the position of the mirrors as nested in the block. Warping and twisting of the block may also increase heat absorption due to the misdirected laser energy. The distortions may then result in unwanted heat build up in and around the mirrors. Heat build up affects the integrity of the mirrors and has the potential to affect the life of the galvo motors as well as being detrimental to the laser processing itself. Thermal and deformational analysis of the block was used as a design guide in developing a block in which thermal and mechanical distortion is minimized during laser processing at high galvanometer speeds and under full power heat load.

The length of the rectangular machined nested galvo block 18 must also be sufficient to accommodate the selected number of galvos 16 in a dense configuration. In the embodiment described herein, the galvos 16 are densely positioned in the block, for example, each galvo may be positioned approximately 92 mm apart when measuring from the center of a 30 mm galvo system to the center of an adjacent system. For the example of six galvos 16 being nested in the machined block, the block would have a length of approximately 590.6 mm.

More specifically, the block is machined with not only multiple cooling methods contemplated but the goal of maintaining mirror position and alignment during laser processing. Further, difficulties associated with calibrating a plurality of galvo systems for simultaneous use are reduced. After machining the block, the galvo systems 16 are positioned therein and the machine block is then referred to as the nested galvo block 18. The galvo systems 16 are nested at a high density, in close proximity to one another. The design of the block supports the higher density of galvos while allowing the galvos to be used at a higher power and galvo speeds. The higher density of galvo systems results in keeping the field of view for each galvo systems as small as possible which aids in processing with a smaller spot size while providing overlapping of the field of views of adjacent galvos. This provides for increased flexibility in allowable cut geometries while providing an optimum system processing speed. A smaller spot size has a higher density of power, which results in being able to move the spot size along a given workpiece at a higher speed.

In one embodiment, the galvos nested within the block are each rated for use at 500 watts by the manufacturer of the system, however once each galvo was positioned in the block according to this disclosure, the galvo block supports use of the 500 watt galvos with a beam from an approximately 1000 watt power laser, due to the built in cooling system(s). The nested galvo block supports use of galvos with laser beams of a power higher than for which some galvos are commercially rated. The nested galvo block of this disclosure comprising multiple galvos in close proximity increases the power that a mirror can withstand due to the built in cooling. With the built in cooling of the nested galvo block of the present disclosure, larger mirrors or mirrors able to withstand higher powers are not required to laser process with higher powers. Such larger mirrors would take more space, and as has been explained herein reduce productivity of the system. The use of smaller mirrors in turn reduces the distance between adjacent galvos which results in a higher density of beams across the width of the laser system which in turn results in a higher potential productivity of the nested galvo system.

The starting metal piece may also be machined to include channels for liquid cooling 22, and vents and air passages for airflow cooling 24. Simultaneously, the block is then machined to produce the open nesting spaces 30 described previously, the open nesting spaces being spaced apart such that one galvo system is nested in one open nesting space. Once the block has been machined, each galvo system is nested therein, including each x and y mirror and its respective motor. Each system will be then be calibrated and positioned precisely within the block for laser processing. The nested galvo block due to its integral nature maximizes vibration damping. Vibrations are produced for the most part by the movement of the mirrors.

The nested galvo block 18 and in particular the galvo systems 16 within the block are protected by a window (not shown). The window protects the galvo systems from debris and gases produced by and rising from the processing of the work piece 14 by the laser beams 12.

Each galvo may be positioned adjacent a second galvo where the spacing between each galvo is approximately 92 mm from center line to center line (galvo center line). Thus, multiple laser beams can be directed for simultaneous laser processing of a substrate wherein the laser beams are in closer proximity to one another. The laser beams steered by the nested galvo block then each have an overlapping field of view. The proximity of the galvos allows for the plurality of laser beams directed to the substrate to simultaneously have a smaller, more precise focal point or focal spot and an overlapping field of view with adjacent galvo systems.

The use of a single galvo system in laser processing does not generally require further consideration of cooling the system, or the mirrors or motor. However, the heat build-up associated with a plurality of laser beams directed into a single block comprising a plurality of galvo systems, requires additional attention to cooling systems. To prevent overheating of the components, warping or damaging of the mirrors and even distortion of the block itself, the block is formed with the liquid cooling system. The liquid cooling system comprises a plurality of channels or passages integrally formed along a length of the block. The integral liquid cooling channels surround the block, particular along its length. The cooling channels use liquid flow to cool the block itself and the heat that accumulates from each galvo motor nested in the block as well as to dissipate any residual heat from the laser beam and individual mirrors. The liquid cooling system may utilize cool water or other liquids which will act to cool the block by continuous flow.

In addition to the liquid cooling system 22 incorporated into the block itself, the block 20, as described previously above, can be machined with a plurality of air vents as well as air passages, to utilize an air-flow cooling system 24. The airflow cooling system utilizes the vents as well as the air passages to cool each individual mirror respectively. The vents and air passages are positioned with respect to each mirror such that the volume of airflow is directed to the backside of each mirror to minimize thermal effects of the laser beam as steered by each mirror. Airflow through the nested galvo block 18 is generally in the direction such that air blows on a backside or surface of each mirror. The backside of each mirror is opposite the surface or side to which the laser beam is directed and reflects from. More specifically, the airflow is directed in substantially the same direction with respect to each "x" mirror and in the same direction with respect to each "y" mirror.

In addition to the backside of each mirror, airflow is also directed along a spine of the block. There are elongated slots for airflow proximate each galvo such that each mirror has its own air flow line including intake and exit ports.

The block of the present disclosure is adapted to support airflow at approximately 100 CFH (cubic feet per hour) to each galvo mirror such that in the embodiment illustrated in FIG. 3, the total airflow supported is approximately 1200 CFH during laser processing while maintaining each individual mirror's positioning for directing its respective laser beam. The airflow cooling system 24 successfully keeps the mirrors cool by preventing the slow build up of heat from steering the laser beam. The airflow cooling system 24 is designed not to affect or inhibit the movement of the mirrors during laser processing.

Airflow cooling of the mirrors is further supported by the use an extension manifold to connect each port together. Exit ports are positioned along the block and the block is further machined with no tight seals as to allow the air and heat to dissipate more efficiently.

The example provided herein is exemplary and should not be construed to limit the disclosure described herein.

Example 1

In one embodiment of the present disclosure, a galvo block is machined to comprise six nested galvo systems, the liquid cooling channels and airflow cooling paths as replicated for each galvo. The galvos used are 30 mm galvos rated at approximately 500-watts without cooling. The galvo block is suitable for use with a laser processing system comprising six laser beams, the laser beams running at 1000-watt average power. The galvo block may be positioned in the laser processing system directly opposing the laser beam source 13 and configuration such that each galvo is approximately aligned with one laser beam. As illustrated in FIG. 4, the galvos 16 are positioned a distance 34 from the web 14, for example, the galvos 16 are approximately 226 mm (8.90 inches) from, or above, a web for laser processing the substrate on the web. This configuration is suitable for laser processing on a web having a width 36 anywhere from approximately 550 mm (21.65 in) up to approximately 638.8 mm (25.15 inches) at a desired useable field of view of approximately 177.8 mm (7 in). Each galvo 16 is positioned and nested in the block 20, spaced by a center line distance 38, for example, the galvos 16 are nested approximately 92 mm apart from centerline to centerline. For a galvo 16 positioned within the block and nested between two adjacent galvos 16, a useable field of view 40 on the web can be attained that is approximately 177.8 mm (7 in). For each galvo positioned on an end of the block, the useable field of view, for this particular web configuration, would extend beyond the web, due to this a reduced useable field of view of approximately 91.7 mm (3.61 inches) in the cross-web direction used. This arrangement allows each galvo to direct a laser beam in a field of view completely within the web width.

The galvo block is further positioned such that the laser beams are directed to the web with approximately an 85.7 mm (3.375 in) overlap 42 of the adjacent field of the view of each laser beam. The galvo block supports multiple beam laser processing, at a higher power, on the web by comprising the higher density of galvos positioned in the block. The block construction allows for sufficient cooling of the block and the galvos via liquid and airflow cooling of the mirrors. The mirrors are sufficiently cooled and positioning maintained within the block throughout laser processing, while each laser beam also maintains a small, precise, focal point within the fields of view as described above.

Further embodiments of the present disclosure may consider galvo systems and mirrors available in a variety of sizes, each to suit a specific need. For each various mirror size, a common block to mount a plurality of galvos in a closely nested configuration is recognized. It is further recognized that the spacing between each galvo system needs to be varied based on mirror size, the larger the mirror the larger the spacing. Also for each nested block a variety of field of views is available by changing the distance between the work surface and the galvo block. In general, as this distance increases so does the field of view as well as the spot size for a given galvo, laser, beam diameter, and focus lens configuration.

Although the present disclosure has been described with reference to preferred embodiments, workers skilled in the art will recognize that changes may be made in form and detail without departing from the spirit and scope of the invention.

What is claimed:

1. A galvo block, the block comprising:
   a main body;
   a plurality of vents in the main body;
   a plurality of passages in the main body;
   a plurality of openings in the main body;
   a plurality of galvos nested densely within the main body; and
   wherein the main body comprises a solid rectangular block machined to remove selected areas of material from the block to form any one of the vents, passages and a plurality of openings and wherein the block has no substantially closed or full internal walls or partitions between adjacent galvos nested densely within the main body.

2. The block of claim 1 and further comprising a cooling system.

3. The block of claim 2 wherein the cooling system comprises a liquid cooling system and/or an airflow cooling system.

4. The block of claim 1 wherein the plurality of passages are enclosed and extend along a length of the main body to support a liquid flow component of a liquid cooling system.

5. The block of claim 1 wherein the vents are replicated proximate each galvo nested within the main body and wherein the vents direct airflow for an airflow cooling system.

6. The block of claim 1 wherein each opening in the plurality of openings in the main body supports nesting of one galvo in the plurality of galvos within the main body.

7. The block of claim 6 wherein the plurality of galvos comprises at least independently and selectively positionable galvo systems and the plurality of galvos are nested linearly and adjacent to one another within the main body.

8. The block of claim 7 wherein the plurality of galvos are nested such that the distance between the centers of each adjacent galvo is approximately 92 mm for a 30 mm galvo.

9. The block of claim 7 positioned in a laser processing system and operable to steer a corresponding plurality of laser beams concurrently to laser process a substrate.

10. A multi-galvo housing system comprising:
    A metal block machined to house at least two galvo systems therewithin wherein each galvo system comprises at least one mirror and a corresponding motor for steering said mirror and wherein each galvo system is configured to steer a laser beam, each laser beam from a minimal wattage, at 1000 watt power or greater, and wherein the block keeps the galvo systems sufficiently aligned so as to concurrently direct at least two laser beams from the at least two galvo systems within the block and the at least two laser beams onto a work piece to process the work piece in a selected manner, the metal block controlling mechanical stability and heat build-up sufficiently to avoid distortion of the block and to maintain alignment of the at least one mirror of each galvo system within the block for laser processing, and
    wherein the block has no substantially closed or full internal wall or partitions between adjacent galvos.

11. The galvo system of claim 10 wherein the block controls heat build-up by comprising at least one cooling system replicated for each galvo.

12. The galvo system of claim 11 where the at least one cooling system comprises an airflow cooling system, wherein the airflow cooling system comprises a plurality of vents and openings.

13. The galvo system of claim 11 wherein at least one cooling system comprises a liquid flow cooling system, the liquid flow cooling system comprises a plurality of channels extending along the block.

14. The galvo system of claim 10 wherein the block is further machined with a pair of openings replicated for each galvo, a first opening for accepting a laser beam from a laser source and a second opening for steering the laser beam out and to the workpiece such that the laser beam is directed through the block to the workpiece.

* * * * *